US010140638B2

(12) United States Patent
Akolkar et al.

(10) Patent No.: US 10,140,638 B2
(45) Date of Patent: Nov. 27, 2018

(54) PROVIDING INFORMATION TECHNOLOGY RESILIENCY IN A CLOUD-BASED SERVICES MARKETPLACE

(71) Applicant: International Business Machines Corporation, Armonk, NY (US)

(72) Inventors: Rahul P. Akolkar, Tuckahoe, NY (US); Thomas E. Chefalas, Somers, NY (US); Jim A. Laredo, Katonah, NY (US); Chang-Shing Perng, Goldens Bridge, NY (US); Anca Sailer, Scarsdale, NY (US); Frank A. Schaffa, Hartsdale, NY (US); Alla Segal, Mount Kisco, NY (US); Ignacio Silva-Lepe, Putnam Valley, NY (US); Tao Tao, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 13/706,884

(22) Filed: Dec. 6, 2012

(65) Prior Publication Data
US 2014/0164166 A1 Jun. 12, 2014

(51) Int. Cl.
G06Q 30/00 (2012.01)
G06Q 30/06 (2012.01)

(52) U.S. Cl.
CPC ..... G06Q 30/0611 (2013.01); G06Q 30/0627 (2013.01)

(58) Field of Classification Search
CPC .................................................. G06Q 30/0607
USPC ....................................................... 705/26.4
See application file for complete search history.

(56) References Cited

U.S. PATENT DOCUMENTS

| 7,181,526 | B1* | 2/2007 | Bell | H04L 12/1877 370/390 |
|---|---|---|---|---|
| 2004/0103116 | A1* | 5/2004 | Palanisamy | G06F 17/30569 |
| 2004/0120705 | A1* | 6/2004 | Friskney | H04J 14/0227 398/5 |
| 2004/0181782 | A1* | 9/2004 | Findeisen | G06F 12/0253 717/130 |
| 2004/0205058 | A1* | 10/2004 | Kiji | G06Q 10/10 |

(Continued)

OTHER PUBLICATIONS

Amazon http://docs.amazonwebservices.com/AWSEC2/latest/UserGuide/Welcome.html.

(Continued)

Primary Examiner — Yogesh C Garg
Assistant Examiner — Lalith M Duraisamygurusamy
(74) Attorney, Agent, or Firm — Kurt Goudy

(57) ABSTRACT

A method for providing a cloud-based service includes receiving information from a customer of the service over a conversational interface, the information identifying a requirement of the customer related to a resiliency of the service, and identifying a service provider who provides the service in a manner that satisfies the requirement. A method for building a knowledge base of cloud-based service providers includes receiving information from a service provider, the information specifying at least one resiliency attribute of the service provider, matching the information to a standardized service descriptor, wherein the service descriptor is indexed within an ontology-based organizational framework that indexes a plurality of service descriptors, and storing the service descriptor for the service provider.

20 Claims, 4 Drawing Sheets

(56) References Cited

U.S. PATENT DOCUMENTS

| | | | | |
|---|---|---|---|---|
| 2005/0096955 A1* | 5/2005 | Sorensen | G06Q 10/06 | 705/26.4 |
| 2006/0117365 A1* | 6/2006 | Ueda | G11B 27/031 | 725/112 |
| 2006/0248458 A1* | 11/2006 | Li | G06F 17/30684 | 715/700 |
| 2006/0258463 A1* | 11/2006 | Cugno | A63F 13/12 | 463/42 |
| 2007/0055555 A1* | 3/2007 | Baggett | G06F 17/30457 | 705/5 |
| 2007/0083607 A1* | 4/2007 | Thompson | G06F 9/5027 | 709/217 |
| 2007/0186156 A1* | 8/2007 | Bagare | G06F 8/10 | 715/234 |
| 2007/0244737 A1* | 10/2007 | Herrin | G06Q 10/109 | 705/7.18 |
| 2008/0255918 A1* | 10/2008 | Madhavan | G06F 17/30734 | 705/7.17 |
| 2009/0054030 A1* | 2/2009 | Golds | H04M 15/00 | 455/406 |
| 2009/0260041 A1* | 10/2009 | McGinn | H03M 13/29 | 725/62 |
| 2010/0169343 A1* | 7/2010 | Kenedy | G06F 17/30867 | 707/758 |
| 2010/0191595 A1* | 7/2010 | Graves | G06F 3/0605 | 705/14.36 |
| 2010/0211782 A1* | 8/2010 | Auradkar | H04L 9/083 | 713/168 |
| 2011/0060622 A1* | 3/2011 | Piersol | G06F 11/1474 | 707/637 |
| 2012/0166310 A1* | 6/2012 | Werklund | G06Q 30/00 | 705/26.41 |
| 2012/0197726 A1* | 8/2012 | Aggarwal | G06Q 30/02 | 705/14.64 |
| 2012/0232902 A1* | 9/2012 | Bocchieri | G10L 15/063 | 704/243 |
| 2012/0253791 A1* | 10/2012 | Heck | G06F 17/30867 | 704/9 |
| 2012/0310831 A1* | 12/2012 | Harris | G06Q 30/02 | 705/44 |
| 2013/0117157 A1* | 5/2013 | Iyoob | G06O 30/06 | 705/26.41 |
| 2013/0238596 A1* | 9/2013 | Mandelstein | G06F 17/30563 | 707/714 |
| 2013/0262340 A1* | 10/2013 | Seiz | G06Q 40/06 | 705/36 R |

OTHER PUBLICATIONS

SAP Marketplace: http://www.sdn.sap.com/iri/scn/go/portal/prtroot/docs/library/uuid/40f412ca-f0cf-2d10-3dbb-aad32c3f17e2?QuickLink=index&overridelayout=true , consists of 44 pages.
Jamcracker: http://www.jamcracker.com/Cloud_Services_Brokerage.
CAARCserve—https://support.ca.com//cadocs/0/CA%20ARCserve%20Replication%20and%20High%20Availability%20Option%20for%20Windows%20r16-ENU/Bookshelf_Files/HTML/RELNOTES/index.htm, consists of 33 Pages.

* cited by examiner

PROVIDING INFORMATION TECHNOLOGY RESILIENCY IN A CLOUD-BASED SERVICES MARKETPLACE

BACKGROUND OF THE INVENTION

The present invention relates generally to cloud computing and relates more specifically to providing information technology resiliency for cloud-based services.

Cloud computing is the use of computing resources (e.g., hardware and software) that are delivered as a service over a network (e.g., the Internet). For instance, an enterprise (e.g., a business or other organization) may move a portion of its information technology (IT) infrastructure to "the cloud" as a means of simplifying maintenance of the IT infrastructure and providing resiliency (i.e., availability of data in the face of infrastructure outage).

Conventionally, the burden is on the customer to provision their cloud-based services for resiliency. For instance, many cloud-based service providers require customers to complete a risk analysis checklist in order to help the service providers meet the customer's resiliency needs. However, many customers do not actually know how to specify their resiliency needs. Moreover, even if the customer is able to accurately specify its resiliency needs, the service provider may not support the resiliency level required or may exit from the marketplace before the customer's contract expires.

SUMMARY OF THE INVENTION

A method for providing a cloud-based service includes receiving information from a customer of the cloud-based service over a conversational interface, where the information identifies a requirement of the customer related to a resiliency of the service, and identifying at least one service provider who provides the cloud-based service in a manner that satisfies the requirement of the customer.

A method for building a knowledge base of cloud-based service providers includes receiving information from a cloud-based service provider, wherein the information specifies at least one resiliency attribute of the cloud-based service provider, matching the information to a standardized service descriptor, wherein the standardized service descriptor is indexed within an ontology-based organizational framework that indexes a plurality of standardized service descriptors, and storing the standardized service descriptor for the cloud-based service provider.

A method for providing a cloud-based service includes receiving information from a customer of the cloud-based service over a conversational interface, the information identifying a requirement of the customer related to a resiliency of the service, generating a first model that represents the requirement of the customer, receiving information from a cloud-based service provider, wherein the information specifies at least one resiliency attribute of the cloud-based service provider, generating a second model that represents the at least one resiliency attribute, wherein the second model is indexed within an ontology-based organizational framework that indexes a plurality of models associated with a plurality of cloud-based service providers, matching the first model to the second model when the at least one resiliency attribute indicates that the cloud-based service provider is capable of satisfying the requirement of the customer, and forwarding information about the cloud-based service provider to the customer.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the invention is a method and apparatus for providing information technology (IT) in a cloud-based services marketplace. Embodiments of the invention shift the burden of provisioning for resiliency from the customer to the service marketplace. In particular, embodiments of the invention model a customer's resiliency needs and various service providers' abilities to provide resiliency and then match the customer with the service providers who can potentially meet the customer's resiliency needs.

Figure 1:
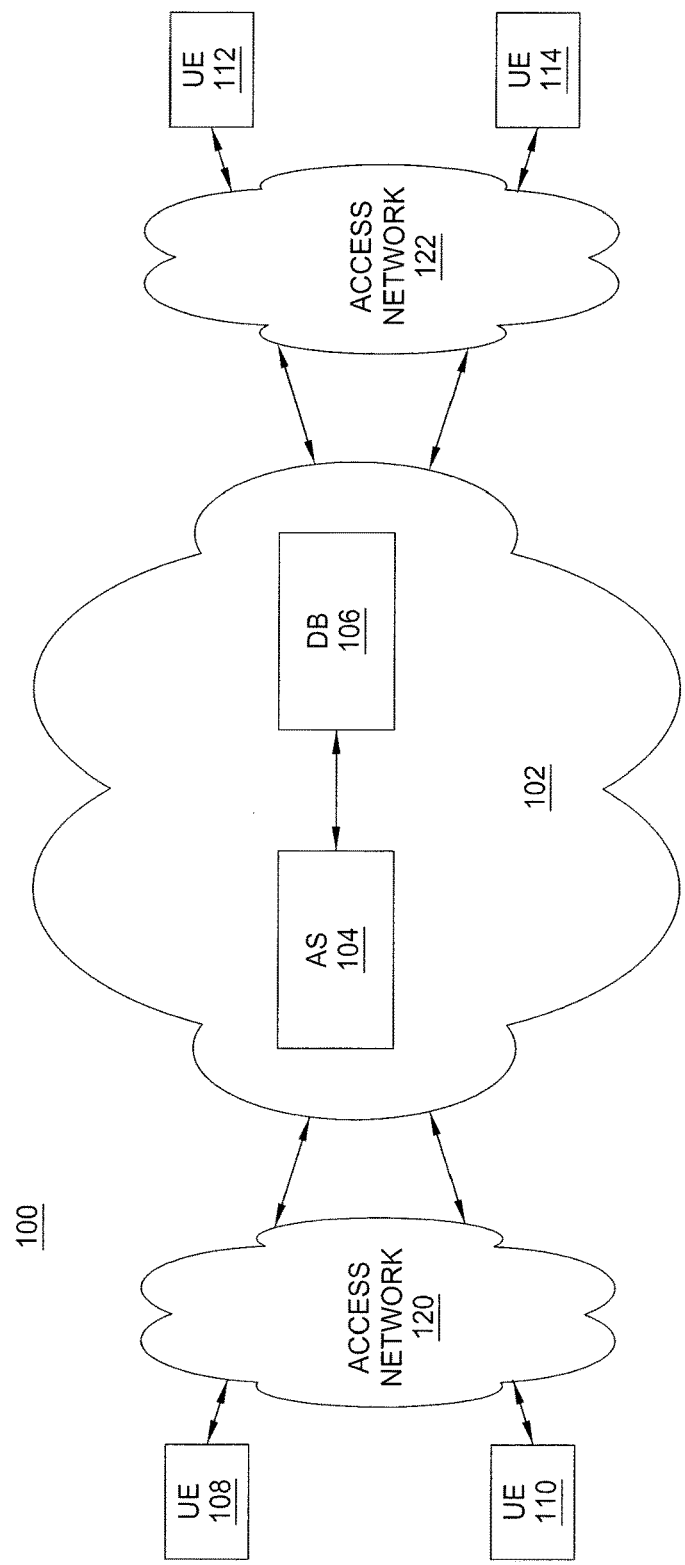
FIG. 1 is a block diagram depicting one example of a network within which embodiments of the present invention may be deployed.

FIG. 1 is a block diagram depicting one example of a network 100 within which embodiments of the present invention may be deployed. The network 100 may be any type of communications network, such as for example, an Internet Protocol (IP) network (e.g., an IP Multimedia Subsystem (IMS) network, an asynchronous transfer mode (ATM) network, a wireless network, a cellular network, a long term evolution (LTE) network, and the like). An "IP network" is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed. For instance, the core network 102 may comprise a portion of a cloud environment in which services and applications are supported in a highly distributed manner.

Figure 4:
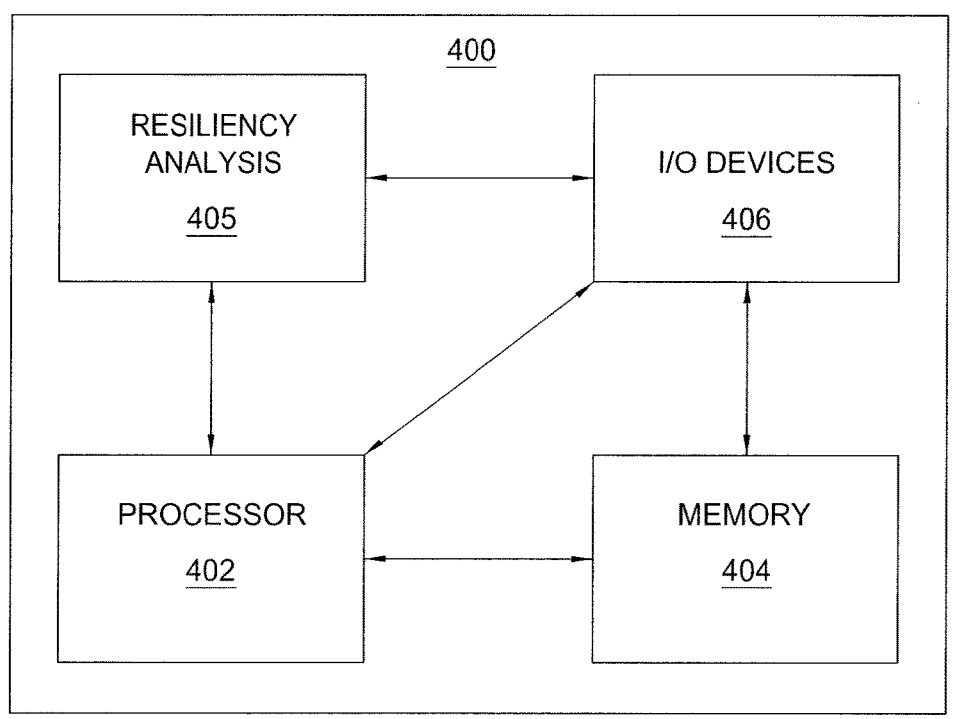
FIG. 4 is a high-level block diagram of the resiliency analysis method that is implemented using a general purpose computing device.

In one embodiment, the AS 104 may comprise a general purpose computer as illustrated in FIG. 4 and discussed below. In one embodiment, the AS 104 may perform the methods and algorithms discussed below related to providing information technology (IT) resiliency in a cloud-based services marketplace. For instance, the AS 104 may comprise a datacenter that supports cloud-based services (e.g., data provisioning or other IT-related services). In one embodiment, the AS 104 includes a dynamic conversational user interface for interacting with service providers and customers in the network 100.

In one embodiment, the DB 106 stores data relating to the cloud-based services supported by the AS 104 and relating to customers of the cloud-based services; thus, in one embodiment, the DB 106 functions as a service knowledge base. For instance, the DB 106 may store standardized resiliency specification descriptions (service descriptors) and resiliency models for service providers and customers. This information may be stored in encrypted form in order to protect any information that is deemed to be sensitive. Although only one DB 106 is illustrated, the network 100 may include multiple databases. For instance, separate databases may be maintained for storing the customer and service provider resiliency models.

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device that is capable of accessing services from a cloud-based service provider, such as a desktop computer or a mobile endpoint device such as a cellular telephone, a smart phone, a tablet computer, a laptop computer, a netbook, an ultrabook, a portable media device (e.g., an MP3 player), a gaming console, a portable gaming device, and the like. It should be noted that although only four user endpoint devices are illustrated in FIG. 1, any number of user endpoint devices may be deployed. In one embodiment, any of the user endpoint devices may have one or more sensors integrated therein. These sensors may include, for example, location sensors, environmental sensors, acoustic sensors, position sensors, optical sensors, pressure sensors, proximity sensors, and the like. The AS 104 may subscribe to the outputs of these sensors.

It should be noted that the network 100 has been simplified. For example, the network 100 may include other network elements (not shown) such as border elements, routers, switches, policy servers, security devices, a content distribution network (CDN) and the like.

Figure 2:
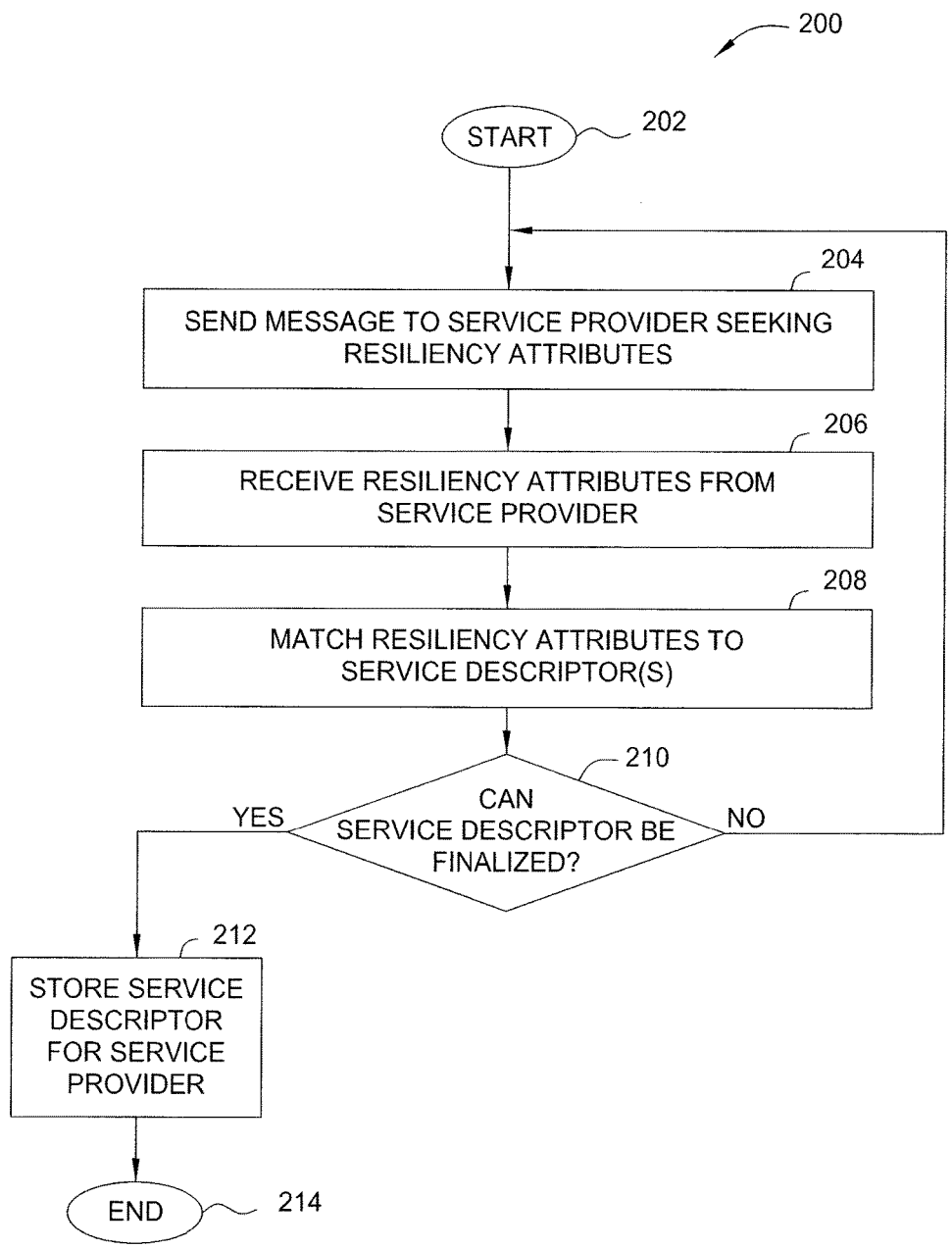
FIG. 2 is a flow diagram illustrating one embodiment of a method for providing information technology resiliency in a cloud-based services marketplace.

FIG. 2 is a flow diagram illustrating one embodiment of a method 200 for providing information technology resiliency in a cloud-based services marketplace. In particular, the method 200 generates a standardized service descriptor for a cloud-based service provider. As discussed in further detail below, the service descriptor may be used to match the service provider with customers who required a level of resiliency that the service provider is capable of providing. The method 200 may be executed, for example, by the AS 104 illustrated in FIG. 1. As such, reference is made in the discussion of the method 200 to various components of the network 100 illustrated in FIG. 1.

The method 200 begins in step 202. In step 204, the AS 104 sends a message to a cloud-based service provider (e.g., to a user endpoint device 108-114 operated by the service provider). The message seeks the service provider's resiliency attributes. The resiliency attributes may be defined in terms of one or more metrics, domains, functions, or sources of failure. The metrics may include, for example, typical service-level agreement key performance indicators such as: the service's availability, reliability, integrity, maintainability, or confidentiality. The domains may include, for example, typical realms of administrative authority, such as: network, systems, middleware, service, or business. The functions may include, for example, typical types of cloud-based services, such as: monitoring, incident/error management, security, governance, or compliance. The sources of failure may include, for example, typical broad sources of service errors, such as: human, machine, or disaster.

In step 206, the AS 104 receives a response from the service provider. The response includes at least some of the resiliency attributes that the AS 104 solicited in step 204.

In step 208, the AS 104 matches the resiliency attributes to at least one service descriptor. In one embodiment, this matching involves querying the DB 106 for existing service descriptors that most closely match the resiliency attributes provided by the service provider.

In step 210, the AS 104 determines whether the service descriptor for the service provider can be finalized. In one embodiment, this involves determining whether enough is known about the service provider's resiliency attributes to identify the service descriptor that best represents the service provider. In one embodiment, the AS 104 is considered to have enough information to finalize the service descriptor if all of the resiliency attributes can be mapped to information technology artifacts. The more information that is provided up-front (e.g., in the first iteration of step 206), the more automated the process can be. If the AS 104 concludes in step 210 that more information about the service provider's resiliency attributes is required, then the method 200 returns to step 204 and the AS 104 proceeds as described above (e.g., by sending a further request to the service provider).

Alternatively, if the AS 104 concludes in step 210 that no further information is needed in order to finalize the service descriptor for the service provider, then the method 200 proceeds to step 212. In step 212, the AS 104 stores or associates the service descriptor that best matches the service provider's resiliency attributes with the service provider. In one embodiment, this association is stored in the DB 106.

The method 200 ends in step 214.

In one embodiment, service descriptors include tags that assist the AS 104 in matching the service descriptors to service-provider-specified resiliency attributes. Similar service descriptors can be grouped together to form service-provider-side resiliency models. In one embodiment, the models are ontology-based. In particular, resiliency attributes can be indexed within in an organizational framework that represents knowledge about the service providers. For instance, specific resiliency attributes may be represented as concepts within the general domain of service provider resiliency, and the relationships between those concepts can be further illustrated. As discussed above, the general domain of service provider resiliency may include concepts (resiliency attributes) such as metrics, domains, functions, and sources of failure. Any of these concepts may be related to others of the concepts and may further include sub-concepts (e.g., the metrics concept might include sub-concepts such as availability, reliability, integrity, maintainability, or confidentiality).

As discussed above, modeling resiliency on the service-provider-side is one part of the present solution; further embodiments of the invention also model customer-side resiliency requirements so that customers and service providers can be matched effectively.

Figure 3:
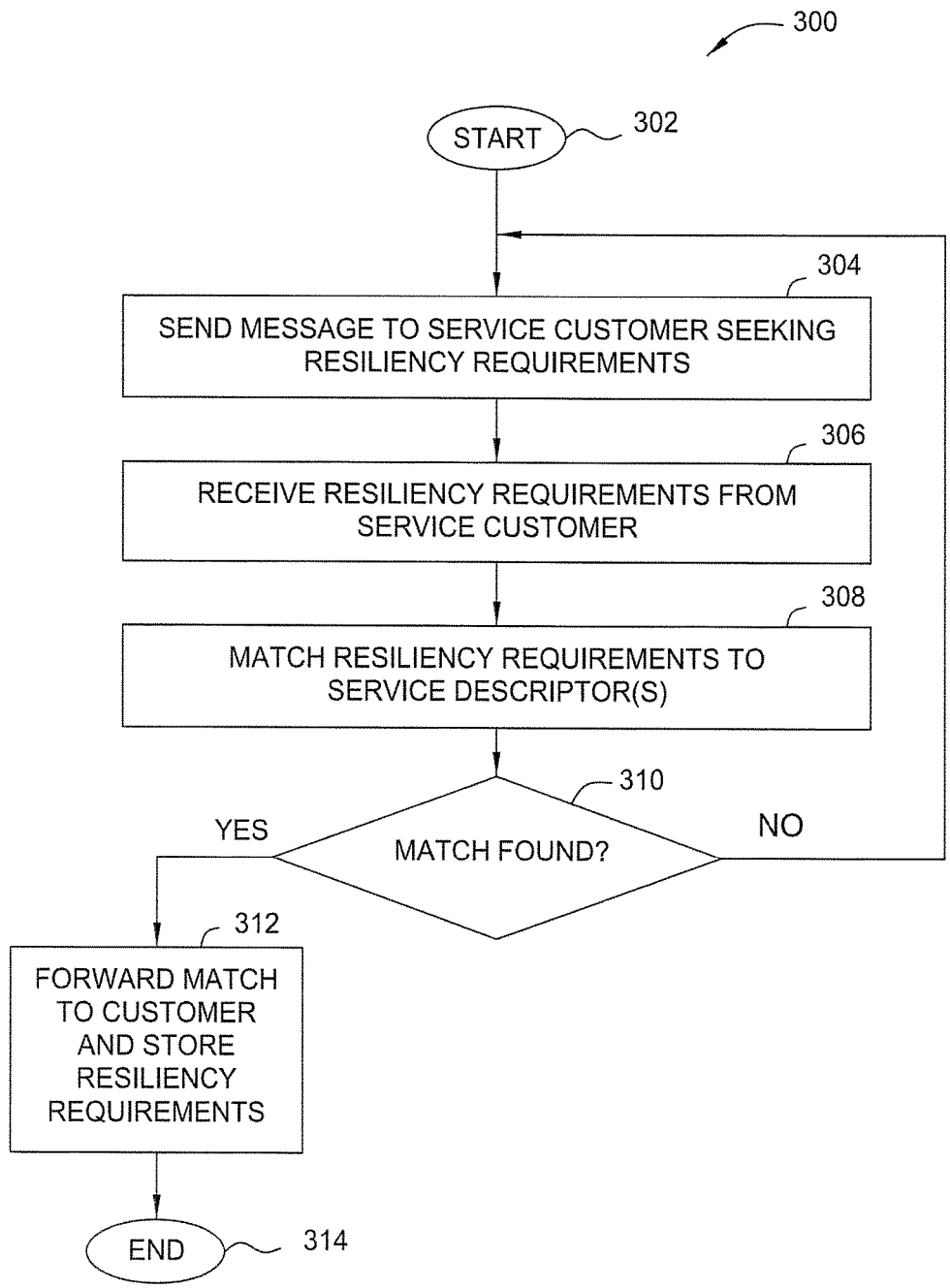
FIG. 3 is a flow diagram illustrating another embodiment of a method for providing information technology resiliency in a cloud-based services marketplace.

FIG. 3 is a flow diagram illustrating another embodiment of a method 300 for providing information technology resiliency in a cloud-based services marketplace. In particular, the method 300 models a cloud-based service customer's resiliency requirements and identifies service providers or service products that meet these resiliency requirements. The method 300 may be executed, for example, by the AS 104 illustrated in FIG. 1. As such, reference is made in the discussion of the method 300 to various components of the network 100 illustrated in FIG. 1.

The method 300 begins in step 302. In step 304, the AS 104 sends a message to a cloud-based service customer (e.g., to a user endpoint device 108-114 operated by the customer). The message seeks the customer's resiliency requirements. The resiliency requirements may be defined in terms of one or more metrics, domains, functions, or sources of failure. The metrics may include, for example, typical service-level agreement key performance indicators such as: the service's availability, reliability, integrity, maintainability, or confidentiality. The domains may include, for example, typical realms of administrative authority, such as: network, systems, middleware, service, or business. The functions may include, for example, typical types of cloud-based services, such as: monitoring, incident/error management, security, governance, or compliance. The sources of failure may include, for example, typical broad sources of service errors, such as: human, machine, or disaster.

In step 306, the AS 104 receives a response from the customer. The response includes at least some of the resiliency requirements that the AS 104 solicited in step 304. In one embodiment, the messages exchanged in steps 304 and 306 are sent and received over a dynamic, conversational user interface. The conversational user interface allows the customer to specify his or her resiliency requirements in a conversational manner, using natural language. Thus, the customer is not necessarily required to have an in-depth understanding of the cloud-based service infrastructure in order to convey his or her resiliency requirements.

In step 308, the AS 104 matches the resiliency requirements to at least one service descriptor representing a service provider or service product. In one embodiment, this matching involves querying the DB 106 for existing service descriptors that most closely match the resiliency requirements provided by the service provider. The degree of the match required (e.g., exact match, match within a specified tolerance, etc.) may be specified by the customer. In one particular embodiment, unsatisfactory or non-matching service descriptors are first excluded from consideration, and the remaining service descriptors are then analyzed in order to determine which service descriptors most closely match the stated requirements.

In step 310, the AS 104 determines whether at least one service descriptor matching the resiliency requirements has been found. In one embodiment, multiple potentially matching service descriptors may be found. If the AS 104 concludes in step 310 that no matching service descriptors have been found, then the method 300 returns to step 304 and the AS 104 proceeds as described above (e.g., by sending a further request to the customer). As an alternative, the AS 104 may also propose alternative resiliency requirements or service providers or service products that most closely meet the customer's resiliency requirements.

Alternatively, if the AS 104 concludes in step 310 that at least one service descriptor matching the resiliency requirements has been found, then the method 300 proceeds to step 312. In step 312, the AS 104 forwards information about the service providers or service products whose service descriptors match the resiliency requirements to the customer. The AS 104 also stores the customer's resiliency requirements and potential service providers/service products as part of a model of the customer's resiliency needs. In one embodiment, this model is stored in the DB 106.

The method 300 ends in step 314.

The model of the customer's resiliency needs may be continuously updated by the AS 104 in substantially real time using a method substantially similar to the method 300. However, rather than send a message directly to the customer to solicit the resiliency needs (e.g., as in step 304), the AS 104 may build a new query for further service matching based on the current resiliency service to which the customer subscribes and/or any stored resiliency requirements. In one embodiment, the suitability of a service provider or service product as a failover alternative is based at least in part on a consideration of core marketplace functionality. In a further embodiment, the suitability is based at least in part on a consideration of stand-alone services. These steps may be implemented, for example, on a periodic basis (e.g., every x hours) or on an event-driven basis (e.g., a new service descriptor is added to the DB 106) to maintain an up-to-date list of failover alternatives.

New matches (or a limited number of the top matches) identified by the new query may be stored as failover alternatives in the model of the customer's resiliency needs. In one embodiment, the failover alternatives are maintained as a ranked list. The ranking may be based on a calculated metric that assigns weights to various customer model criteria (e.g., cost, budget, etc.), number and/or type of resiliency requirements met, deployment timeline, and/or other criteria. In another embodiment, customer resiliency requirements are represented in a tree-like graph structure in which the root nodes of the tree represent business rules, and the remainder of the nodes represents the information technology stack. In this case, a graph matching algorithm can be employed to provide the ranking (e.g., based on the degree of similarity among potential matching services).

Thus, in the event that the customer suffers a service failure, a failover may be identified from the model of the customer's resiliency needs. For instance, the failover may be a current service to which the customer explicitly subscribes as a failover, or it may be a failover stored in a list of identified alternatives as described above.

FIG. 4 is a high-level block diagram of the resiliency analysis method that is implemented using a general purpose computing device 400. The general purpose computing device 400 may comprise, for example, the application server 104 illustrated in FIG. 1. In one embodiment, a general purpose computing device 400 comprises a processor 402, a memory 404, a resiliency analysis module 405 and various input/output (I/O) devices 406 such as a display, a keyboard, a mouse, a stylus, a microphone or transducer, a wireless network access card, an Ethernet interface, and the like. In one embodiment, at least one I/O device is a storage device (e.g., a disk drive, an optical disk drive, a floppy disk drive). It should be understood that the resiliency analysis module 405 can be implemented as a physical device or subsystem that is coupled to a processor through a communication channel.

Alternatively, the resiliency analysis module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the resiliency analysis module 405 for providing information technology (IT) in a cloud-based services marketplace, as described herein with reference to the preceding figures, can be stored on a tangible computer readable storage medium or device (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A computer-implemented method for providing computing resources as a service to an endpoint device over a content distribution network, the method comprising:
   receiving a first plurality of data packets over a conversational interface from the endpoint device;
   extracting from the first plurality of data packets information identifying in natural language a requirement of a customer operating the endpoint device, wherein the requirement is related to a resiliency with which the computing resources are provided to the endpoint device;
   translating the information from the natural language into a first data structure that represents the requirement of the customer, wherein the first data structure comprises a tree-like graph structure in which root nodes of the tree-like graph structure represent business rules, and non-root nodes of the tree-like graph structure represent an information technology stack;
   matching the first data structure to a stored second data structure that describes a resiliency attribute of a candidate service provider who provides the computing resources over the content distribution network in a manner that satisfies the requirement of the customer, wherein the stored second data structure is one of a plurality of stored second data structures, and wherein the matching is facilitated by tags included in the plurality of stored second data structures;
   ranking a plurality of service providers who can serve as alternatives to the candidate service provider to form a ranked list, wherein service providers of the plurality of service providers are ranked according to a degree of similarity of a corresponding one of the plurality of stored second data structures to the first data structure, and wherein the degree of similarity is computed using a graph matching algorithm;
   forwarding a second plurality of data packets containing information about the candidate service provider to the endpoint device;
   subsequent to the forwarding, building a third data structure based on a combination of the first data structure and a resiliency of the candidate service provider with respect to providing the computing resources to the endpoint device, wherein the building is performed without directly soliciting further information from the customer;
   periodically repeating the matching and the ranking using the third data structure in place of the first data structure, without prompting from the customer, in order to update the ranked list; and
   connecting the endpoint device with an alternative service provider selected from the ranked list as updated when a failure of the candidate service provider is detected, wherein the alternative service provider continues to provide the computing resources to the endpoint device over the content distribution network.

2. The method of claim 1, wherein the second data structure comprises a service descriptor.

3. The method of claim 2, wherein the service descriptor is a standardized representation of the resiliency attribute.

4. The method of claim 3, wherein the standardized representation is indexed within an ontology-based organizational framework that indexes a plurality of standardized representations describing respective resiliency attributes of a plurality of different service providers including the candidate service provider.

5. The method of claim 4, wherein each of the plurality of standardized representations is associated with at least one concept in the organizational framework.

6. The method of claim 5, wherein the at least one concept is one of: a metric associated with the service, a domain associated with the service, a function associated with the service, or a source of failure associated with the service.

7. The method of claim 6, wherein the metric is a measure of at least one of: an availability of the service, a reliability of the service, an integrity of the service, a maintainability of the service, or a confidentiality of the service.

8. The method of claim 6, wherein the domain is at least one of: a network domain, a systems domain, a middleware domain, a service domain, or a business domain.

9. The method of claim 6, wherein the function is at least one of: a monitoring function, an incident or error management function, a security function, a governance function, or a compliance function.

10. The method of claim 6, wherein the source of failure is at least one of: a human, a machine, or a disaster.

11. The method of claim 2, wherein the service descriptor is one of a plurality of service descriptors stored in a database.

12. The method of claim 11, wherein the querying comprises:
   excluding from consideration those of the plurality of service providers whose service descriptors fail to match the requirement of the customer; and
   selecting the candidate service provider from among those of the plurality of service providers that are not excluded.

13. The method of claim 2, wherein the service descriptor exactly matches the requirement of the customer.

14. The method of claim 2, wherein the service descriptor matches the requirement of the customer within a specified tolerance.

15. The method of claim 1, wherein the service providers of the plurality of service providers are ranked according to a metric.

16. The method of claim 15, wherein the requirement of the customer is one of a plurality of requirements, and wherein the metric assigns weight to a plurality of criteria including a number of the plurality of requirements that are met by a corresponding service provider and a deployment timeline by which the corresponding service provider is able to provide the computing resources to the endpoint device in accordance with the plurality of requirements.

17. A system for providing computing resources as a service to an endpoint device over a content distribution network, the system comprising:
 a processor; and
 a non-transitory computer readable storage medium that stores instructions which, when executed, cause the processor to perform operations comprising:
  receiving a first plurality of data packets over a conversational interface from the endpoint device;
  extracting from the first plurality of data packets information identifying in natural language a requirement of a customer operating the endpoint device, wherein the requirement is related to a resiliency with which the computing resources are provided to the endpoint device;
  translating the information from the natural language into a first data structure that represents the requirement of the customer, wherein the first data structure comprises a tree-like graph structure in which root nodes of the tree-like graph structure represent business rules, and non-root nodes of the tree-like graph structure represent an information technology stack;
  matching the first data structure to a stored second data structure that describes a resiliency attribute of a candidate service provider who provides the computing resources over the content distribution network in a manner that satisfies the requirement of the customer, wherein the stored second data structure is one of a plurality of stored second data structures, and wherein the matching is facilitated by tags included in the plurality of stored second data structures;
  ranking a plurality of service providers who can serve as alternatives to the candidate service provider to form a ranked list, wherein service providers of the plurality of service providers are ranked according to a degree of similarity of a corresponding one of the plurality of stored second data structures to the first data structure, and wherein the degree of similarity is computed using a graph matching algorithm;
  forwarding a second plurality of data packets containing information about the candidate service provider to the endpoint device;
  periodically repeating the matching and the ranking using the first data structure, without prompting from the customer, in order to update the ranked list; and
  subsequent to the forwarding, building a third data structure based on a combination of the first data structure and a resiliency of the candidate service provider with respect to providing the computing resources to the endpoint device, wherein the building is performed without directly soliciting further information from the customer;
  periodically repeating the matching and the ranking using the third data structure in place of the first data structure, without prompting from the customer, in order to update the ranked list; and
  connecting the endpoint device with an alternative service provider selected from the ranked list as updated when a failure of the candidate service provider is detected, wherein the alternative service provider continues to provide the computing resources to the endpoint device over the content distribution network.

18. The system of claim 17, wherein the matching comprises:
 querying a database that stores service descriptors for a plurality of service providers including the candidate service provider;
 excluding from consideration those of the plurality of service providers whose service descriptors fail to match the requirement of the customer; and
 selecting the candidate service provider from a list of service providers that remains after the excluding.

19. A system for providing computing resources as a service to an endpoint device over a content distribution network, the system comprising:
 a conversational interface coupled to the content distribution network for receiving a first plurality of data packets from an endpoint device operated by the customer, for extracting a natural language input from the first plurality of data packets, and for translating the natural language input into a first data structure that represents a requirement of the customer related to a resiliency with which the computing resources are provided to the endpoint device, wherein the first data structure comprises a tree-like graph structure in which root nodes of the tree-like graph structure represent business rules, and non-root nodes of the tree-like graph structure represent an information technology stack; and
 a resiliency analysis engine for matching the first data structure to a stored second data structure that describes a resiliency attribute of a candidate service provider who provides the computing resources over the content distribution network in a manner that satisfies the requirement of the customer, wherein the stored second data structure is one of a plurality of stored second data structures, and wherein the matching is facilitated by tags included in the plurality of stored second data structures, for ranking a plurality of service providers who can serve as alternatives to the candidate service provider to form a ranked list, wherein service providers of the plurality of service providers are ranked according to a degree of similarity of a corresponding one of the plurality of stored second data structures to the first data structure, and wherein the degree of similarity is computed using a graph matching algorithm, for forwarding a second plurality of data packets containing information about the candidate service provider to the endpoint device, for, subsequent to the forwarding, building a third data structure based on a combination of the first data structure and a resiliency of the candidate service provider with respect to providing the computing resources to the endpoint device, for periodically repeating the matching and the ranking using the third data structure in place of the first data structure, without prompting from the customer, in order to update the ranked list, and for connecting the endpoint device with an alternative service provider selected from the ranked list as updated when a failure of the candidate service provider is detected, wherein the alternative service provider continues to provide the computing resources to the endpoint device over the content distribution network.

20. The system of claim 19, further comprising:
a database for storing the first data structure, the plurality of stored second data structures, and the third data structure.

* * * * *